United States Patent [19]

McPhee

[11] Patent Number: 4,782,953

[45] Date of Patent: Nov. 8, 1988

[54] FOOD POUCH HOLDER

[76] Inventor: Charles J. McPhee, 8562 Larthorn Dr., Huntington Beach, Calif. 92646

[21] Appl. No.: 130,073

[22] Filed: Dec. 8, 1987

[51] Int. Cl.$^4$ .............................. B65D 81/34
[52] U.S. Cl. ...................... 206/557; 206/45.34; 99/355
[58] Field of Search ............ 206/557, 559, 45.34, 206/525; 219/10.55 E; 426/107, 113; 248/95, 97; 211/13, 184; 99/355, 359, 352, 357, 426, 449, 451, 450; 220/DIG. 5

[56] References Cited

U.S. PATENT DOCUMENTS

| | | | |
|---|---|---|---|
| 3,446,416 | 5/1969 | Epstein | 206/557 |
| 4,270,660 | 6/1981 | Putt | 99/426 X |
| 4,448,309 | 5/1984 | Roccaforte | 206/525 |
| 4,603,825 | 8/1986 | Kotliar | 206/525 X |
| 4,671,404 | 6/1987 | Wall et al. | 206/525 X |

Primary Examiner—Harvey C. Hornsby
Assistant Examiner—K. O'Leary
Attorney, Agent, or Firm—Tilton, Fallon, Lungmus

[57] ABSTRACT

A holder for food pouches of the type in which foods are commonly sold and stored, usually in frozen condition, and in which such foods are later cooked by microwave energy or in boiling water by consumers. The holder is formed of hard, transparent, flexible, plastic material and has a base and a pair of side walls defining an open-topped channel for receiving and retaining such a pouch. Slits formed in the side walls permit a user to squeeze end sections of such side walls together for gripping a hot food pouch as it is moved about in the kitchen and during opening of the pouch and serving of the food.

18 Claims, 2 Drawing Sheets

FOOD POUCH HOLDER

BACKGROUND AND SUMMARY

The cooking instructions for frozen foods sold in plastic pouches usually direct users to place the pouches in boiling water or in a microwave oven for designated intervals until the contents are fully heated and ready to serve. For microwave cooking, venting of such a pouch is required and the vents, even when carefully formed, may cause some spilling of the contents during a cooking operation. Whether cooked in a microwave oven or in boiling water, such food pouches are inconvenient to handle when hot, and difficulties are often encountered in supporting the pouches as they are cut open and their contents removed. While clamps and other utensils may be used to reduce such difficulties, the handling of hot food pouches has continued to present difficulties for consumers.

Racks of various types are frequently used in cooking procedures. For example, racks have been used for barbecuing (U.S. Pat. No. 4,559,869) roasting (U.S. Pat. No. 3,585,922), and warming food items (U.S. Pat. No. 3,994,213). To my knowledge, however, no one has previously suggested the possibilities and the advantages of providing a holder for plastic pouches of the type in which frozen foods are thawed and heated or cooked by microwave energy or boiling water.

An important aspect of this invention therefore lies in providing a plastic holder in which frozen food pouches may be supported during and following cooking in a microwave oven or, alternatively, following cooking in boiling water. Being formed of rigid and electrically nonconductive plastic, the holder is unaffected by microwave energy and may be used to support a food package during the cooking or heating operation. Because of its configuration, the holder allows the hot foods to settle to the bottom of the vertically-supported pouch, leaving the empty upper end of the pouch exposed so that it may be easily cut open for serving of the food. In serving the food, a user may easily squeeze the end wall sections of the holder together to securely clamp the pouch in place and permit its contents to be poured therefrom. Such pouring or serving operation may be readily performed without requiring any direct contact between the hot pouch and the user's fingers.

Briefly, the holder comprises a stand of U-shaped cross section formed of hard, flexible, plastic material having a planar base and two generally planar, spaced, parallel side walls formed integrally with the base and extending upwardly therefrom. Each side wall has a main section and at least one end section with the two sections separated from each other by a generally vertical slit. Ideally, a pair of such slits are provided in each side wall, dividing that wall into a main section and two such end sections. The side walls have upper portions flared outwardly to facilitate insertion of a food pouch into the narrow open-topped channel defined by the base and side walls. Gripping ribs are provided by the end sections and enlarged flanges serve as finger guards (or guides) adjacent the vertical slits. The transparency of the holder allows a user to see the food package and its contents during cooking and serving.

Other features, advantages, and objects will become apparent from the specification and drawings.

Drawings

DETAILED DESCRIPTION OF THE PREFERRED EMBODIMENTS

Figure 1:
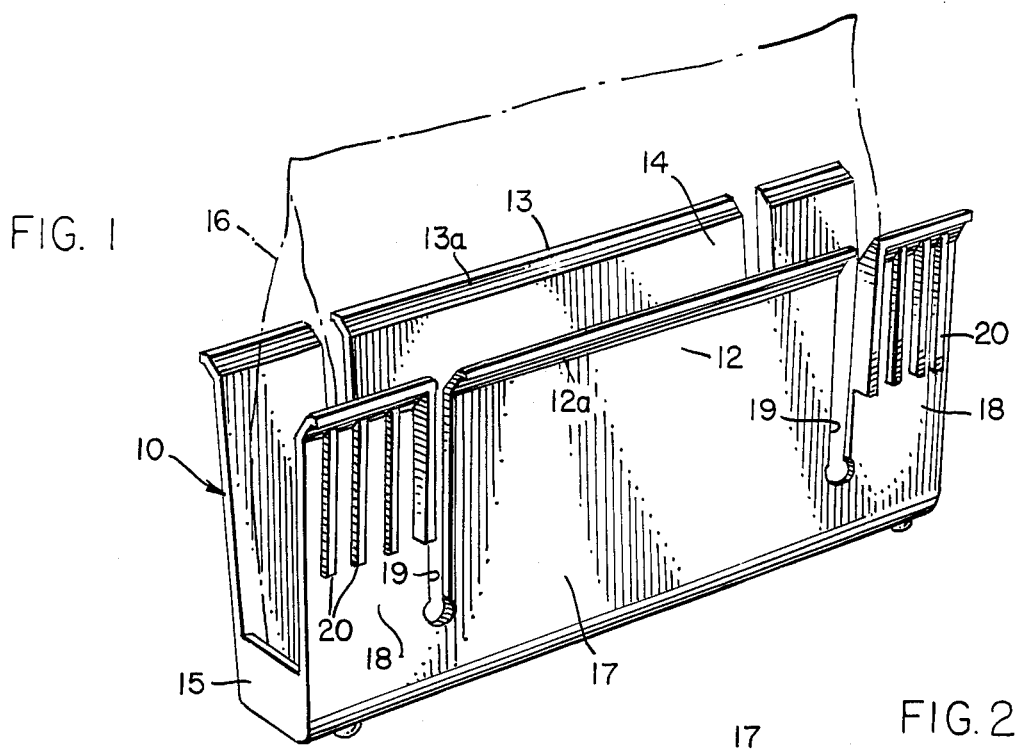
FIG. 1 is a perspective view of a food pouch holder embodying the present invention, a pouch supported by the holder being depicted in phantom.
Figure 2:
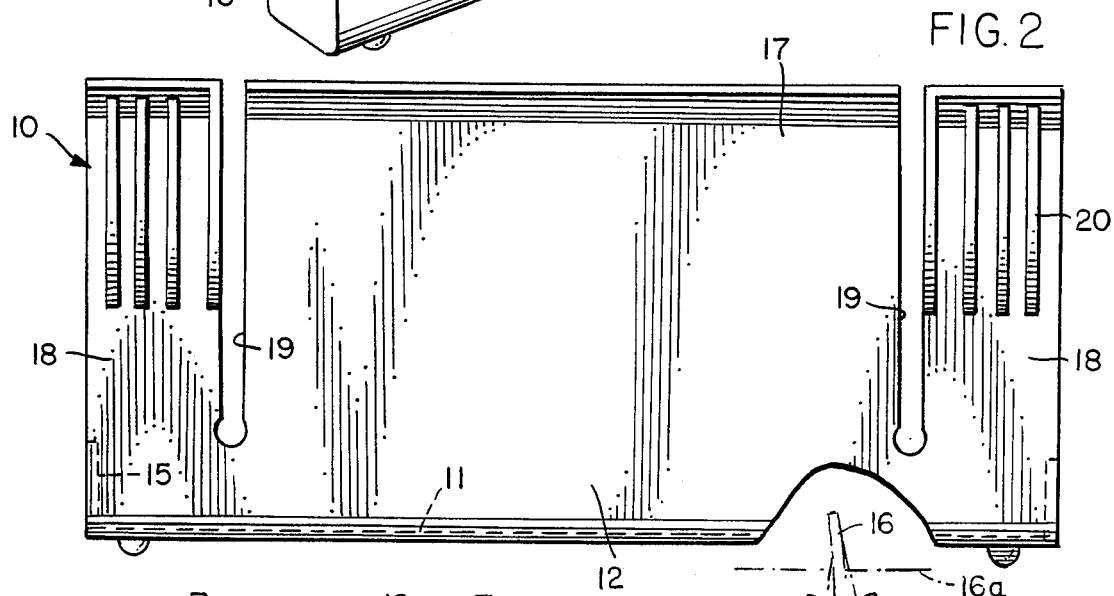
FIG. 2 is a side elevational view of the holder.
Figure 3:
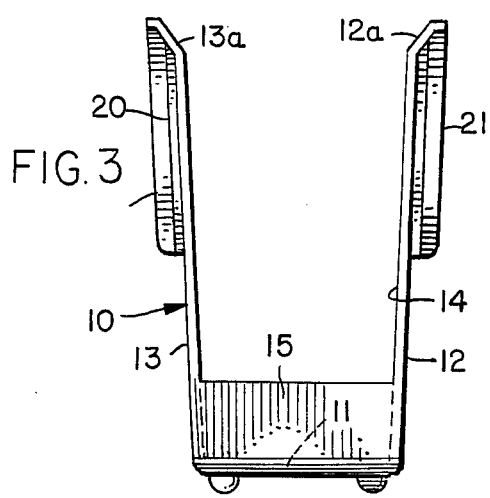
FIG. 3 is an end elevational view of an empty holder in unflexed condition.

Referring to FIGS. 1-5, the food pouch holder takes the form of a stand 10 formed integrally of a hard, flexible, plastic material. While any of a variety of so-called rigid plastics may be used, a high-temperature thermoplastic such as polycarbonate has been found particularly effective. While it is not essential that the holder be formed of transparent material, transparency is highly advantageous because it allows the user to view the contents of the holder before, during, and following a cooking operation.

The stand has a planar base 11 and a pair of upstanding side walls 12, 13 that, together with the base, define an open-topped channel or chamber 14. If desired, the lower ends of the channel may be closed by integral end walls 15 that serve as stops to limit the extent of longitudinal sliding movement of a pouch 16 within the channel. The side walls in unflexed condition are disposed in spaced and generally parallel relation, as depicted most clearly in FIGS. 1 and 3, and have outwardly flared upper edge portions 12a and 13a to facilitate insertion of a food pouch into channel 14.

Figure 4:
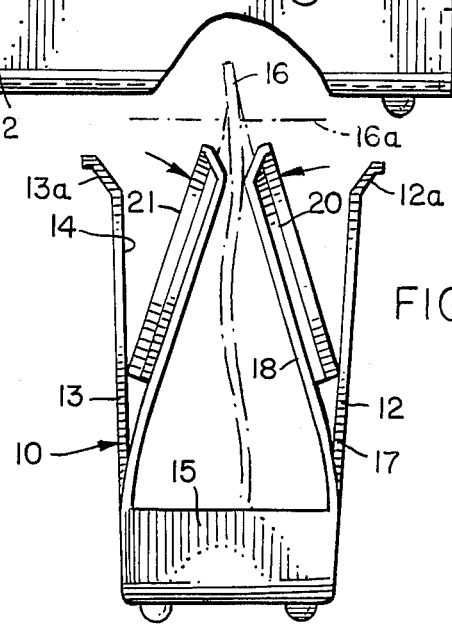
FIG. 4 is an end elevational view illustrating the end sections of the holder being urged together to clamp a food pouch therebetween.

It will be observed that each side wall has a main section 17 and at least one end section 18 separated from each other by a generally vertical slit 19. In the preferred embodiment depicted in FIGS. 1-5, each side wall is provided with two such slits 19 and, therefore, two end sections 18. The length of main section 17 is substantially greater than that of each end section 18 and, in fact, substantially greater than the combined length of those end sections. Because of the slits, the opposing pairs of end sections 18 may be squeezed between the fingers and urged together to clamp the ends of a pouch 16 therebetween without affecting the positions of the main sections 17 of the side walls (FIG. 4).

Figure 5:
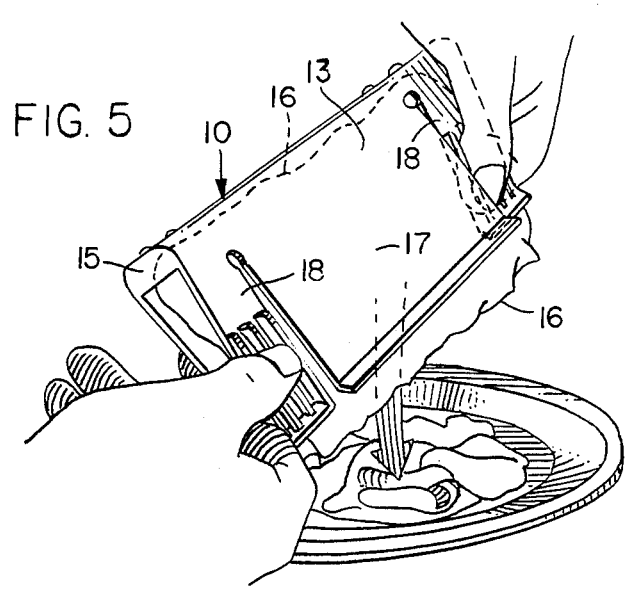
FIG. 5 is a perspective view showing the holder as it would be used during serving of the food.

Vertical ribs 20 are formed in the outer surfaces of the end sections 18 to prevent a user's fingers from slipping when the opposing end sections are squeezed together (FIG. 5). Also, each end section has an enlarged vertical flange 21 immediately adjacent slits 19 to serve as stops or guards that help in properly locating a user's fingers against end sections 18.

In use of the holder, where a food package is to be heated in a microwave oven, the package 16 is simply placed into channel 14 and the top of the package is vented with a fork or other suitable utensil. The plastic stand and the package supported by it are then placed in a microwave oven and heated according to the directions provided by the food package. Since the package is supported in vertical position, the food, as it is heated, settles downwardly, eliminating or reducing possibilities that such food might leak out of the vent openings. When cooking is completed, the user removes the stand and hot food package from the oven and cuts off the top of the package along the line 16a indicated in FIG. 4. Then, gripping the holder in both hands and squeezing together only the end sections 18 as indicated in FIGS. 4 and 5 to clamp the package in place, the user inverts the holder to pour the contents from the opened package.

Since the ribbed portions of the end sections of the holder remain relatively cool, being above the food level, even when the contents of the package have been microwaved and have reached serving temperature, the holder may be comfortably handled as shown in FIG. 5. No direct finger contact with the plastic package is required. The holder therefore functions as a stand prior to, during, and following a cooking operation and as a holding device to facilitate pouring or serving of the contents of the package following cooking.

While the use of the holder has been described in connection with a food package heated in a microwave oven, it is believed apparent that the holder may be conveniently used to pour or serve the contents of a package heated in boiling water. The heated package is simply placed into the channel, the top of the package is cut open, and its contents are dispensed in the same manner shown in FIG. 5 and described above.

Figure 6:
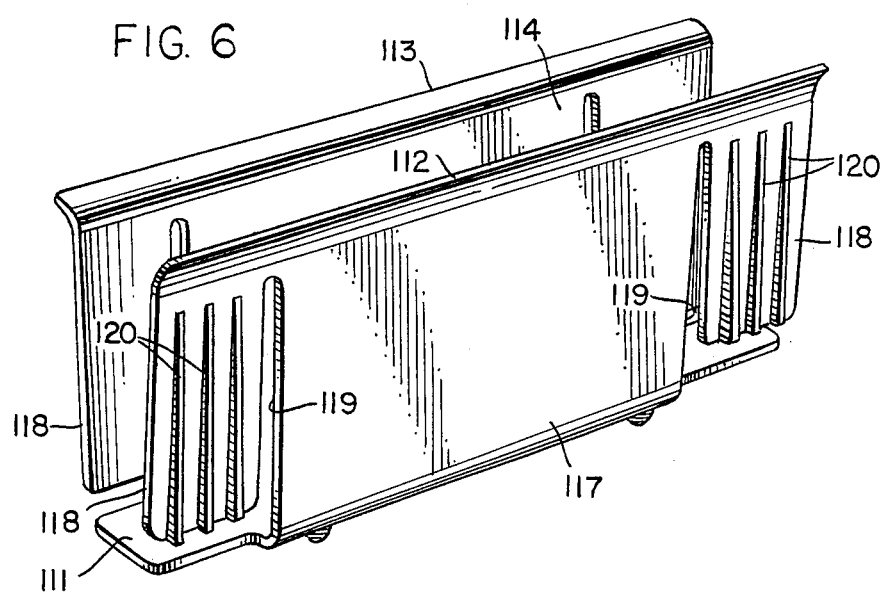
FIG. 6 is a perspective view depicting a second embodiment of the invention.
Figure 7:
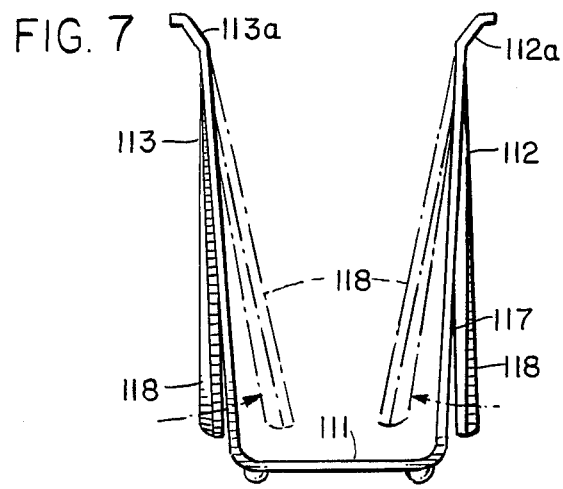
FIG. 7 is an end elevational view of the holder of FIG. 6.

The embodiment of FIGS. 6 and 7 is similar to the one already described except that the side walls 112 and 113 have their slits 119 extending upwardly from the bottom of the side walls and the end sections 118 terminate short of base 111. The end sections 118 are connected at their upper end portions to main sections 117. Vertical ribs 120 extend along the outer surfaces of the end sections to prevent a user's fingers from slipping as the opposing pairs of end sections are squeezed together. The operation is the same as described in connection with the first embodiment, except that it is the lower portions of end sections 118, rather than the upper portions of those sections, that are squeezed together to clamp and hold a food package in place during a pouring or serving operation.

It is believed apparent that the holders described herein may be dimensioned to function as stands and serving devices for frozen food packages of any size. It has been found, however, that most food packages of conventional size may be effectively supported by a holder having side walls of a height within the general range of 2.5 to 4 inches that are spaced apart to define a channel having a width within the range of 0.75 to 1.75 inches. Optimum dimensions are believed to be about 3.0 inches high and 1.25 inches wide. Total length would depend on whether each side wall is provided with one or two flexible end sections; in the preferred embodiments depicted herein, where two such end sections are provided by each side wall, the total length of the side walls may range from 5 to 8 inches (optimally about 6.5 inches) with the main section of each side wall ranging between 3.5 to 5 inches (optimally about 4.25 inches).

While in the foregoing I have disclosed embodiments of the invention in considerable detail for purposes of illustration, it will be understood by those skilled in the art that many of these details may be varied without departing from the spirit and scope of the invention.

I claim:

1. A holder for serving foods cooked in plastic pouches, comprising a stand formed of hard, flexible, plastic material having a planar base and two generally planar, horizontally elongated, spaced and generally parallel side walls formed integrally with said base and extending upwardly therefrom to define an open-topped pouch-receiving channel therebetween; each side wall having a main section and at least one end section separated from each other by a generally vertical slit, with the respective end sections and main sections of said two side walls opposing each other; said end sections of said two side walls being flexible towards each other, when squeezed between a user's fingers, to clamp a side edge portion of a food pouch therebetween for retaining the same within said channel; said slits of said side walls permitting such flexure of said end portions into pouch-clamping relation without appreciably affecting the spacing between said main sections.

2. The holder of claim 1 in which said stand is formed of transparent plastic material.

3. The holder of claim 1 in which said side walls have upper portions flared outwardly away from each other.

4. The holder of claim 1 in which each of said end sections is provided with a plurality of ribs along an outer surface portion thereof.

5. The holder of claim 4 in which said ribs extend vertically.

6. The holder of claim 5 in which each end section includes a finger stop in the form of a vertical, outwardly-extending flange adjacent said slit.

7. The holder of claim 1 in which each of said side walls has a height within the range of about 2.5 to 4 inches and the width of said channel is within the range of 0.75 to 1.75 inches.

8. A holder for serving foods cooked in plastic pouches, comprising a stand formed of hard, flexible, plastic material having a planar base and two generally-planar, horizontally-elongated, substantially parallel side walls formed integrally with said base and extending upwardly therefrom in spaced relation to define an open-topped pouch-receiving channel therebetween; each side wall having a pair of generally vertical slits defining a main section and a pair of end sections at opposite ends of said main section; said end sections of the respective side walls being flexible towards each other, when squeezed between a user's fingers, to clamp the side edge portions of a food pouch supported within said channel; said slits of said side walls permitting such flexure of said end portions into clamping relation without appreciably affecting the spacing between said main sections.

9. The holder of claim 8 in which each side wall has a top edge; said slits therein extending downwardly from said top edge and terminating above said base.

10. The holder of claim 9 in which said stand also includes end walls joining opposite ends of said side walls below the lower limits of said slits.

11. The holder of claim 8 in which said two end sections of each side wall have upper portions joined to said main section therebetween and have bottom edges spaced from said base.

12. The holder of claim 8 in which said stand is formed of transparent plastic material.

13. The holder of claim 8 in which said side walls have upper portions flared outwardly away from each other.

14. The holder of claim 8 in which each of said end sections is provided with a plurality of ribs along an outwardly-facing surface portion thereof.

15. The holder of claim 13 in which said ribs extend generally vertically.

16. The holder of claim 14 in which said end sections are each provided with vertical, outwardly extending flanges adjacent said slits to provide finger stops for positioning and guarding a user's fingers when opposing end sections are squeezed together.

17. The holder of claim 8 in which each of said side walls has a height within the range of about 2.5 to 4 inches and the width of said channel is within the range of about 0.75 to 1.75 inches.

18. The holder of claim 16 in which the length of each of said side walls falls within the range of about 5 to 8 inches.

* * * * *